US009243732B2

(12) United States Patent
Grether et al.

(10) Patent No.: US 9,243,732 B2
(45) Date of Patent: *Jan. 26, 2016

(54) MANUAL SPRAY HEAD

(75) Inventors: Hermann Grether, Muellheim (DE); Christoph Weis, Muellheim (DE)

(73) Assignee: NEOPERL GMBH, Muellheim (DE)

( * ) Notice: Subject to any disclaimer, the term of this patent is extended or adjusted under 35 U.S.C. 154(b) by 875 days.

This patent is subject to a terminal disclaimer.

(21) Appl. No.: 12/818,666

(22) Filed: Jun. 18, 2010

(65) Prior Publication Data

US 2011/0309167 A1 Dec. 22, 2011

(51) Int. Cl.
*B05B 15/08* (2006.01)
*F16L 27/04* (2006.01)
*E03C 1/04* (2006.01)
*F16L 37/088* (2006.01)
*B05B 15/06* (2006.01)
*B05B 1/18* (2006.01)
*F16L 27/08* (2006.01)
*E03C 1/02* (2006.01)
*E03C 1/08* (2006.01)
*F16L 33/20* (2006.01)

(52) U.S. Cl.
CPC . *F16L 27/04* (2013.01); *B05B 1/18* (2013.01); *B05B 15/065* (2013.01); *B05B 15/066* (2013.01); *B05B 15/067* (2013.01); *E03C 1/021* (2013.01); *E03C 1/04* (2013.01); *E03C 1/0401* (2013.01); *E03C 1/0404* (2013.01); *F16L 27/0861* (2013.01); *F16L 37/088* (2013.01); *E03C 2001/0415* (2013.01); *E03C 2001/082* (2013.01); *F16L 33/20* (2013.01)

(58) Field of Classification Search
CPC .. B05B 15/065; B05B 15/066; B05B 15/067; B05B 1/18; F16L 27/0861; F16L 27/04; F16L 33/20; F16L 27/047; F16L 37/088; E03C 1/0401; E03C 1/0404; E03C 1/04; E03C 1/021; E03C 2001/0415; E03C 2001/082
USPC ........ 239/587.1, 587.3, 587.4, 588, 589, 600, 239/DIG. 4, 525, 530, 580; 285/144.1, 285/146.1, 241, 242, 397, 398, 256; 4/675, 4/678
See application file for complete search history.

(56) References Cited

U.S. PATENT DOCUMENTS

| | | | | |
|---|---|---|---|---|
| 2,776,168 A | * | 1/1957 | Schweda | 239/587.4 |
| 3,165,338 A | * | 1/1965 | Moss | 285/256 |
| 3,640,465 A | * | 2/1972 | Hicks | 239/587.1 |

(Continued)

FOREIGN PATENT DOCUMENTS

WO    WO 2008/067879 A1    6/2008

OTHER PUBLICATIONS

Final Office Action and Notice of references cited issued Aug. 19, 2015 in counterpart application U.S. Appl. No. 13/805,110.

*Primary Examiner* — Steven J Ganey
(74) *Attorney, Agent, or Firm* — Volpe and Koenig, P.C.

(57) ABSTRACT

A manual spray head can be connected with a flexible hose line by means of a coupling that has a ball-and-socket joint inserted between the manual spray head and the hose line. This arrangement not only increases the mobility and flexibility between the manual spray head and the flexible hose line, but also permits twisting of the manual spray head relative to the hose line without fear of unscrewing the screw-type connection or similar coupling provided between the manual spray head and the hose line.

15 Claims, 3 Drawing Sheets

(56) References Cited

U.S. PATENT DOCUMENTS

| | | | |
|---|---|---|---|
| 4,431,031 A * | 2/1984 | Ettlinger | 285/256 |
| 5,865,378 A | 2/1999 | Hollinshead et al. | |
| 6,164,570 A * | 12/2000 | Smeltzer | 239/588 |
| 6,629,651 B1 * | 10/2003 | Male et al. | 239/587.4 |
| 6,757,921 B2 * | 7/2004 | Esche | 239/588 |

* cited by examiner

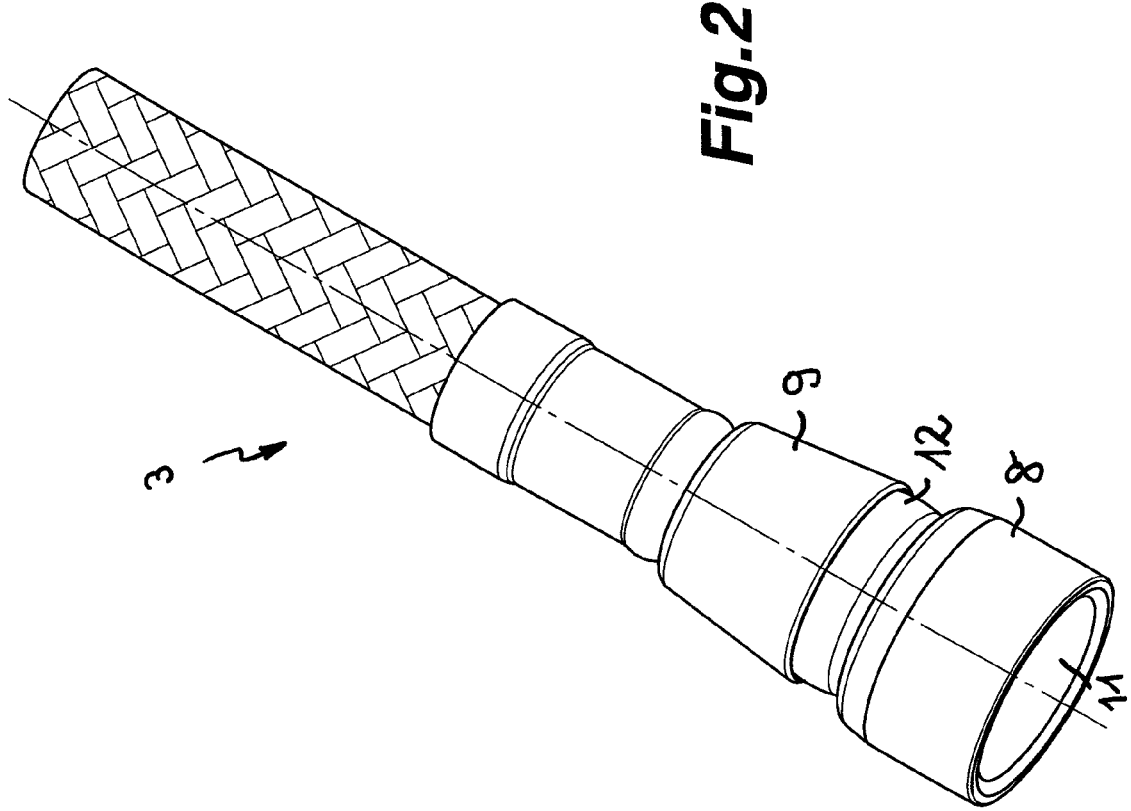

MANUAL SPRAY HEAD

The invention relates to a manual spray head which can be connected with a flexible hose line by means of a coupling.

BACKGROUND OF THE INVENTION

Manual spray heads, which can be used as shower heads or as kitchen spray heads, are known in various constructions. The known manual spray heads are normally connected with a flexible hose line by way of a screw-type coupling, which hose line is, in turn, connected to the water conduit system. The known manual spray heads usually have a spray head grip which carries an external thread on its end region facing away from the spray head. A hose connection is provided on the hose line, which hose connection can be tightly screwed to the external thread of a manual spray head by means of a coupling nut having an internal thread.

However, the screwed connection that is provided in known manual spray heads between the spray head grip and the hose line does not easily allow a rotation of the manual spray head with respect to the longitudinal axis of the hose line, because otherwise the screwed connection between the manual spray head and the hose line may be unintentionally loosened and become loose. The known manual spray heads also normally exhibit wear near the clamping or coupling point to the spray head grip due to overstressing transversely to the longitudinal axis, which is caused by the movement of the manual spray head during its use.

It is therefore an object of the invention to create a manual spray head of the initially mentioned type which is characterized by greater mobility, and especially also by a twisting capability between the manual spray head and the hose line.

SUMMARY OF THE INVENTION

This and other objects and advantages are achieved by the manual spray head according to the invention, in which the coupling provided for using the manual spray head and the hose line has a ball-and-socket joint.

The spray head according to the invention has a coupling which connects the manual spray head with a flexible hose line. This coupling provided for connecting the manual spray head and the hose line has a ball-and-socket joint, inserted between the manual spray head and the hose line. This arrangement not only increases the mobility and flexibility between the manual spray head and the flexible hose line, but also permits twisting of the manual spray head relative to the hose line, without fear of unscrewing the screwed connection or opening-up of a similar coupling provided between the manual spray head and the hose line.

In a structurally simple and preferred embodiment of the invention, the coupling provided for connecting the manual spray head and the hose line is constructed as a screw-type coupling having a spray head connection with an external or internal thread on the manual spray head. The external or internal thread can be connected (preferably detachably) with an internal or external thread on a hose connection of the hose line. When, in this case, a spray head connection with an external thread is provided on the manual spray head and a hose connection with a complementary internal thread is provided on the hose line, commercially available manual spray heads can be mounted on the hose line further developed according to the invention.

The same applies to rotationally rigid plug-type connections or plug-type couplings in this area. The advantages of a better mobility also exist in the case of rotation-free connections or couplings, even if the rotating about the longitudinal axis is carried out at least partly by a non-rotating plug-type connection or plug-type coupling.

Instead, another embodiment according to the invention provides that the coupling provided for the connection of the manual spray head and the hose line is constructed particularly as a rotationally rigid revolving and/or plug-type coupling. Thus, such a revolving and/or plug-type coupling can, for example, also provide a bayonet-type or similar bayonet-lock-type connection between the manual spray head and the hose line.

An exchange of the manual spray head and/or the hose line will be facilitated when the spray head connection and/or the hose connection has a ball-and-socket joint.

In this case, an embodiment is preferred where the hose connection has a ball-and-socket joint which has a first and second joint parts that are connected with one another in a hinged manner and have mutually connected fluid conduits. One joint part carries a hose stem, while the internal or external thread is provided on the other joint part.

In a streamlined embodiment according to the invention that can be produced at low expenditures, the first joint part is held with its universal-ball-joint-shaped or spherical-segment-shaped or similarly spherical front end area of its wall between a form-adapted socket on the second joint part, on the one side, and a joint head on a holding element provided in the inside cavity of the first joint part, on the other side, in a swivelable manner. The holding element penetrates a through-opening of the first joint part by means of a connecting shaft acting upon the second joint part, and mutually connects the fluid conduits of the first joint part as well as the second joint part.

The ball-and-socket joint provided in the coupling further developed according to the invention has two joint parts which are connected with one another in a hinged manner, of which a first joint part has a universal-ball-joint-shaped or spherical-segment-shaped or similarly spherical front end area. In this case, the first joint part is held with its front-side and spherically further developed front-end area between a form-adapted socket on the second joint part, on the one side, and a joint head on a holding element provided in the inside cavity of the first joint part, on the other side, in a swivelable manner. Because the first joint part is therefore securely and firmly held between the second joint part and the holding element, and because the first joint part is secured not only by means of a sealing ring, the ball-and-socket joint has a comparatively high functionality since the holding function and the sealing function are separate from one another and can therefore each be optimized separately. Because the first joint part, which may be arranged on the in-flow or out-flow side of the ball-and-socket joint, is arranged to be swivelable into a socket of the second joint part, the first joint part and the second joint part can be connected with one another without major transitions and particularly without esthetically spoiling variations in diameter. By means of a connecting shaft acting upon the second joint part, the holding element, in this case, penetrates a through-opening of the first joint part, the holding element mutually connecting the fluid conduits of the first joint part as well as of the out-flow part.

In order to integrate the ball-and-socket joint in a manner that is as space-saving as possible in the coupling provided between the manual spray head and the hose line, it is advantageous for one (preferably the first) joint part to have an out-flow side coupling opening with an internal thread, into which internal thread an external thread can be screwed that is provided on the manual spray head.

In this case, a preferred embodiment according to the invention provides that a sleeve-shaped partial area adjoins the spherical front-end area of the first joint part, which partial area carries the internal thread in its sleeve interior that is open on the front side.

It is expedient for the second joint part to carry the hose stem.

To facilitate easy mounting of the component parts of the ball-and-socket joint integrated in the coupling provided between the manual spray head and the hose line, it is expedient for the holding element to be screwable by means of an external thread into an internal thread in the second joint part, and/or for the sleeve interior of the holding element to be further developed as a preferably noncircular tool working surface and particularly as a hexagon socket.

In order to be able to provide a good seal in the area between the joint parts, it is advantageous to provide at least one ring-type seal between the first joint part and the second joint part and/or between the holding element and the first joint part.

It is particularly advantageous to provide at least one ring-type seal and for at least one ring-type seal to be active between the first joint part and the holding element and/or between the first joint part and the second joint part.

It may be expedient for a ring groove for receiving a ring-type seal to be provided at the outer circumference of the holding element, at the inner or outer circumference of the first joint part and/or at the inner circumference of the second joint part in the area of the joint socket.

In a further development of the invention, having its own patentable significance, a spray head fitting having an outlet tube is assigned to the manual spray head. The hose line connected with the manual spray head is guided in the outlet tube, preferably such that it can be pulled out against a restoring force. In this case, it is particularly advantageous for the manual spray head to be held in a readiness position at the outlet tube in such a manner that the coupling between the manual spray head and the hose line is arranged in the tube interior of the outlet tube.

Further developments according to the invention are contained in the description in connection with the drawing and the claims. In the following, the invention will be explained in detail by means of an advantageous embodiment.

BRIEF DESCRIPTION OF THE DRAWINGS

FIG. 2 is a perspective view of the flexible hose line of the kitchen spray head fitting illustrated in FIG. 1 in the area of its hose connection facing the manual spray head;

DETAILED DESCRIPTION OF THE INVENTION

Figure 1:
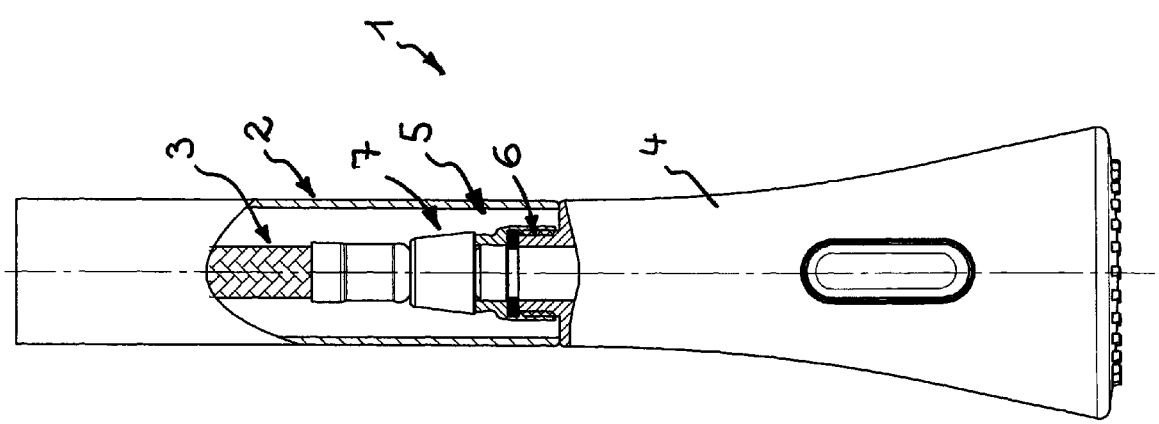
FIG. 1 is a view of a kitchen spray head fitting illustrated in a partially cut fashion, on which a manual spray head is held by means of a pull-down pull-out device, and is connected by way of a flexible hose line to the water conduit network.
Figure 5:
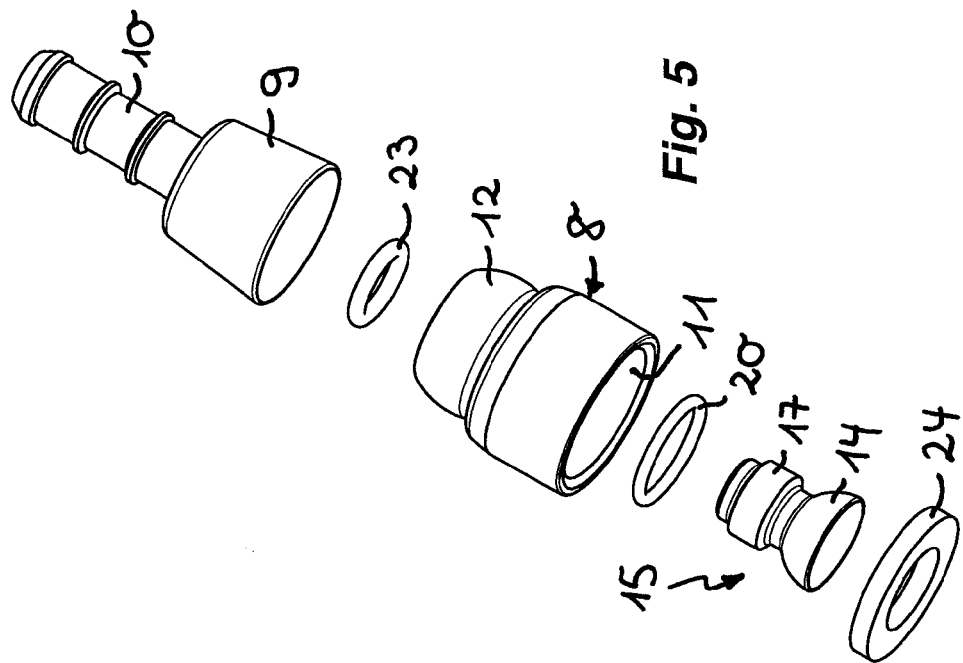
FIG. 5 is an exploded view of the hose connection from FIGS. 3 and 4.

FIG. 1 illustrates a kitchen spray head fitting 1 which has an outlet tube 2. In the outlet tube 2, a flexible hose line 3 is guided so that it can be pulled out against a restoring force and is connected with a manual spray head 4 on its out-flow side hose line end. For this purpose, a coupling 5 is provided which connects the manual spray head with the flexible hose line 3.

FIG. 1 indicates that the coupling provided for connecting the manual spray head 4 and the hose line 3 is configured as a screw-type coupling having a spray head connection with an external thread 6 on the manual spray head, which external thread 6 can be connected, preferably detachably, to a hose connection of the hose line 3. In this case, the hose connection illustrated in detail in a partial longitudinal sectional view in FIGS. 3 and 4 has a ball-and-socket joint 7.

The ball-and-socket joint 7 has first and second joint parts 8, 9 (FIG. 2) which are connected with one another in a hinged manner and have mutually connected fluid conduits. While the second joint part 9 carries a hose stem 10 on its front end facing away from the first joint part 8, the first joint part 8 has a sleeve-shaped partial area which carries the internal thread 11 in its sleeve interior open on the front side. The external thread 6 provided on the manual spray head 4 can be releasably screwed into the internal thread 11 of the first joint part. In this case, the front edge of the manual spray head 4 facing the joint part 8 acts upon a sealing ring 24 in the sleeve interior of the joint part 8 in an axially sealing manner.

The end of the hose line 3 facing the coupling 5 is pushed onto the stem 10 (FIG. 3) and is securely and firmly held there by means of a pressing sleeve 25.

Figure 4:
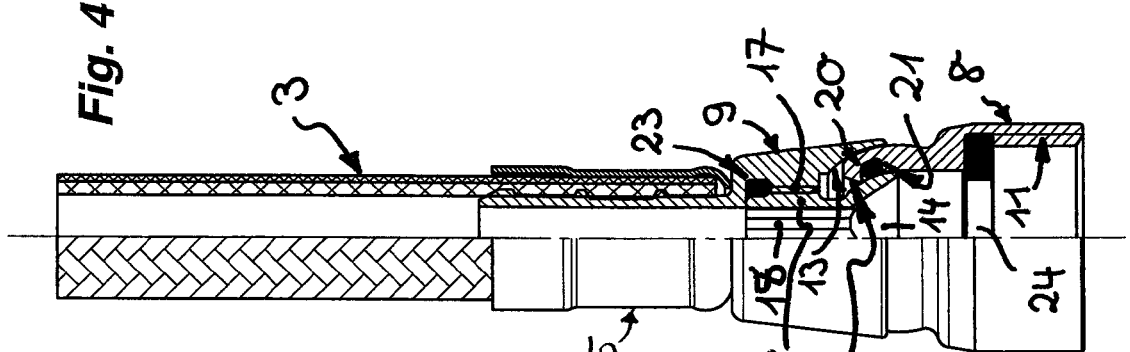
FIG. 4 is a partial longitudinal sectional view of the hose connection from FIGS. 1 to 3 connected with the flexible hose line.
Figure 3:
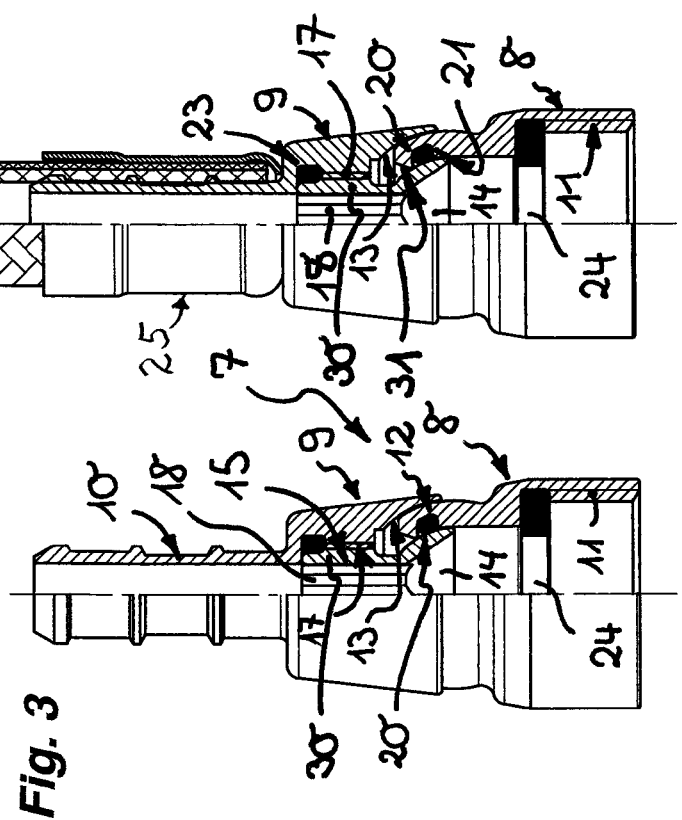
FIG. 3 is a partial longitudinal sectional view of the hose connection of the flexible hose line from FIGS. 1 and 2 having a ball-and-socket joint.

FIGS. 1, 3 and 4 illustrate that the first joint part 6 is held with its universal-ball-joint-shaped or spherical-segment-shaped or similarly spherical front end area 12 of its wall between a form-adapted socket 13 on the second joint part 9, on the one side, and a joint head 14 on a holding element 15 provided in the inside cavity of the first joint part 8, on the other side, in a swivelable manner. (See FIGS. 3 and 4.) The holding element 15 penetrates a through-opening 31 of the first joint part 8 by means of a connecting shaft 30 acting upon the second joint part 9 and mutually connects the fluid conduits of the first joint part 8 as well as of the second joint part 9.

The sleeve-shaped partial area adjoins the spherical front-end area 12 of the first joint part 8 on the flow-off side, which sleeve-shaped partial area carries the internal thread 11 in its sleeve interior.

An external thread 17 of the holding element 15 can be screwed into an internal thread in the second joint part 9, the sleeve interior of the holding element 15 being further developed as a preferably noncircular tool working surface and here as a hexagon socket 18. The external thread 17 of the holding element 15 can be releasably screwed into the internal thread in the second joint part 9 and is water-tightly connected therein. At its end area adjoining the external thread 17, the holding element 15 is radially and/or axially sealed off with respect to the joint part 9 by means of the sealing ring 23.

It is easily recognizable in FIGS. 3 and 4 that at least one ring-type seal 20 is provided between the holding element 15 and the first joint part 8. This ring-type seal 20 is active between the first joint part 8 and the holding element 15. For this purpose, a ring groove 21 (FIG. 4) for receiving the ring-type seal 20 is provided at the inner circumference of the first joint part 8.

In FIG. 1, the manual spray head 4 is illustrated in a readiness position, in which the spray head 4 is held at the outlet tube 2 in such a manner that the coupling 5 between the manual spray head 4 and the hose line 3 is arranged completely in the tube interior of the outlet tube 2 in a covered manner. Since the ball-and-socket joint 7 integrated in the coupling 5 ensures not only a swiveling capability but also a twisting capability of the manual spray head 4 relative to the longitudinal axis of the hose line 3, the manual spray head 4 connected with the hose line 3 is distinguished by a high flexibility and twisting capability without fear of an unintentional unintentionally unscrewing the screw-type connection provided between the manual spray head 4 and the hose line 3, and without the occurrence of the usual damage to the hose close to the grip as a result of being overstressed due to movement.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A manual spray head arrangement comprising:
   a manual spray head;
   a flexible hose line; and
   a coupling, which couples the manual spray head and the flexible hose line, comprising
   a first joint part;
   a second joint part; and
   a holding element; wherein,
   one extremity of said first joint part has an external configuration that is at least partially spherical;
   said second joint part has a socket which has an interior configuration that conforms to the external configuration of the first joint part;
   said extremity of said first joint part is held in said socket of said second joint part by said holding element, a first end of which has a radially extending partially spherical portion that conforms to and bears against an interior surface configuration of said extremity of said first joint part;
   a second end of said holding element, opposite said first end, has a connecting shaft that extends through internal openings of said first and second joint parts, and is configured for attachment to a hose end;
   said holding element has an internal conduit that, when connected to said hose end, communicates fluidically with said hose end,
   the second joint parts carries a hose stem, which is arranged inside of the flexible hose line, and
   a pressing sleeve secures the hose stem to the flexible hose line by the pressing sleeve pressing on an outside of the flexible hose line.

2. A manual spray head having a coupling for connection with a flexible hose line, wherein
   the coupling has a ball-and-socket joint that includes first and second joint parts, which are connected with one another and have mutually connected fluid conduits;
   the second joint part carries a hose stem, with an internal or external thread being provided on the other joint part;
   the first joint part is swivelably held by a universal-ball-joint shaped or substantially spherical front end area thereof, between a form-adapted socket on the second joint part on one side, and a joint head on a holding element provided in the inside cavity of the first joint part, on the other side;
   a connecting shaft of the holding element penetrates a through-opening of the first joint part, and acts upon the second joint part;
   the holding element mutually connects fluid conduits of the first and second joint parts;
   the hose stem is arranged inside of the flexible hose line; and
   a pressing sleeve secures the hose stem to the flexible hose line by the pressing sleeve pressing on an outside of the flexible hose line.

3. The manual spray head according to claim 2, wherein:
   the connection of the manual spray head and the hose line comprises a screw-type coupling; and
   an external or internal thread on the manual spray head is detachably connectable with an internal or external thread on a hose connection of the hose line.

4. The manual spray head according to claim 3, wherein the screw-type coupling comprises one of a revolving coupling and a plug-type coupling.

5. The manual spray head according to claim 3, wherein at least one of the spray head connection and the hose connection has the ball-and-socket joint.

6. The manual spray head according to claim 2, wherein one of the first and second joint parts has an out-flow side opening with an internal thread into which an external thread on the manual spray head can be screwed.

7. The manual spray head according to claim 2, wherein:
   a sleeve-shaped partial area adjoins the substantially spherical front end area of the first joint part; and
   said sleeve-shaped partial area carries the internal thread in its sleeve interior open on the front side.

8. The manual spray head according to claim 7, wherein at least one of the following applies:
   the holding element is configured such that it is screwable into an internal thread in the second joint part by an external thread; and
   the sleeve interior of the holding element comprises a non-circular tool working surface.

9. The manual spray head according to claim 8, wherein the tool working surface comprises a hexagonal socket.

10. The manual spray head according to claim 8, wherein at least one of the following is true:
    the external thread of the holding element can be releasably screwed into the internal thread in the second joint part; and
    the holding element is connected into the second joint part in a water-tight manner.

11. The manual spray head according to claim 2, wherein:
    at least one ring-type seal is provided between one of i) the first joint part and the holding element, and ii) the first joint part and the second joint part.

12. The manual spray head according to claim 2, wherein a ring groove for receiving a ring-type seal is provided at one of i) an outer circumference of the holding element, ii) an inner or outer circumference of the first joint part, and iii) an inner circumference of the second joint part in the area of the joint socket.

13. The manual spray head according to claim 2, wherein:
    a spray head fitting having an outlet tube is assigned to the manual spray head; and
    the hose line connected with the manual spray head is guided in the outlet tube such that it can be pulled out against a restoring force.

14. The manual spray head according to claim 13, wherein the manual spray head is held in a readiness position at the outlet tube, such that the coupling is arranged between the manual spray head and the hose line in the tube interior of the outlet tube.

15. The manual spray head according to claim 2, wherein at least one ring-type seal is provided between one of i) the first and second joint parts, and ii) the holding element and the first joint part.

* * * * *